(12) United States Patent
Bertin et al.

(10) Patent No.: US 9,971,777 B2
(45) Date of Patent: May 15, 2018

(54) SMART ARCHIVING OF REAL-TIME PERFORMANCE MONITORING DATA

(71) Applicant: International Business Machines Corporation, Armonk, NY (US)

(72) Inventors: Luc Bertin, Cantley (CA); Ricardo G. Borba, Ottawa (CA); Alagesan Krishnapillai, Ottawa (CA); Anatoly Tulchinsky, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 14/574,622

(22) Filed: Dec. 18, 2014

(65) Prior Publication Data
US 2016/0179853 A1    Jun. 23, 2016

(51) Int. Cl.
*G06F 17/30* (2006.01)
*G06F 11/34* (2006.01)
*G06F 11/30* (2006.01)

(52) U.S. Cl.
CPC ...... *G06F 17/30073* (2013.01); *G06F 17/303* (2013.01); *G06F 17/30292* (2013.01); *G06F 17/30309* (2013.01); *G06F 11/302* (2013.01); *G06F 11/3082* (2013.01); *G06F 11/3409* (2013.01); *G06F 2201/87* (2013.01)

(58) Field of Classification Search
CPC .................... G06F 17/30073; G06F 17/30292
See application file for complete search history.

(56) References Cited

U.S. PATENT DOCUMENTS

| | | | | |
|---|---|---|---|---|
| 7,287,048 | B2 * | 10/2007 | Bourbonnais | G06F 17/30566 |
| 7,984,131 | B1 * | 7/2011 | Gandhi | H04L 41/0856 |
| | | | | 707/609 |
| 8,386,439 | B2 | 2/2013 | Backa | |
| 8,515,916 | B2 | 8/2013 | Gong | |
| 8,589,439 | B2 | 11/2013 | Coldicott et al. | |
| 8,959,058 | B1 * | 2/2015 | Kleinschnitz | G06F 11/1458 |
| | | | | 707/644 |

(Continued)

OTHER PUBLICATIONS

Baer, Tony, "Why enterprise data archiving is critical in a changing landscape", Ovum white paper for Informatica, provided in Search dated May 5, 2014, pp. 1-7.

(Continued)

*Primary Examiner* — Cam-Y Truong
(74) *Attorney, Agent, or Firm* — Daniel R. Simek

(57) ABSTRACT

A method for archiving monitoring data by enabling real-time analysis within a live database. A processor receives a set of parameters, which is selected based on monitoring data of a system application. The processor determines a historical schema of monitoring data and a retention period for a current schema of monitoring data, based on the set of parameters. The processor performs an impact analysis of the historical schema and retention period of the monitoring data. Upon acceptance of the impact analysis, the processor generates the historical schema which is applied to a table of monitoring data, populated by copying monitoring data from the current schema to the historical schema, within the live database. The processor removes monitoring data exceeding the rolling retention period from both the current schema and historical schema, based on the rolling retention period of the current schema.

10 Claims, 4 Drawing Sheets

(56) References Cited

U.S. PATENT DOCUMENTS

| | | | |
|---|---|---|---|
| 2005/0203887 A1 | 9/2005 | Joshi et al. | |
| 2007/0294308 A1* | 12/2007 | Megerian | G06F 17/30289 |
| 2008/0235304 A1* | 9/2008 | Fujii | G06F 3/0611 |
| 2009/0019103 A1* | 1/2009 | Tommaney | G06F 17/30445 |
| | | | 709/201 |
| 2012/0072412 A1* | 3/2012 | Bestgen | G06F 17/30474 |
| | | | 707/714 |
| 2014/0095443 A1 | 4/2014 | Draese et al. | |

OTHER PUBLICATIONS

"Smart Archiving of Real-Time Performance Monitoring Data", U.S. Appl. No. 14/470,419, filed Jun. 16, 2015, pp. 1-29.
IBM Appendix P, list of IBM patents or patent applications treated as related, pp. 1-2, dated Jun. 16, 2015.

* cited by examiner

SMART ARCHIVING OF REAL-TIME PERFORMANCE MONITORING DATA

BACKGROUND OF THE INVENTION

The present invention relates generally to the field of databases, and more particularly to archiving techniques to facilitate the analysis of performance monitoring data stored within a live database.

Business intelligence (BI) is the set of techniques and tools for the transformation of raw data into meaningful and useful information for business analysis purposes. Common functions of business intelligence technologies are reporting, online analytical processing, analytics, data mining, process mining, business performance management, benchmarking, text mining, predictive analytics, and prescriptive analytics. Stakeholders utilizing BI operations may experience performance degradation of a system providing BI results, and the extensive use of activity or event logging, also referred to as performance monitoring data, on the system is often used to investigate performance issues.

If an issue requires performance monitoring data at a more granular level than is currently being monitored, a system typically requires a restart to change the logging level, and the system performance may degrade further for some period of time while more detailed logging is enabled. Real-time monitoring data is often collected and stored within the live database, or the same database to which the performance monitoring is directed. The real-time monitoring data is held for a defined retention period, then removed from current tables and stored in a separate database, after the retention period has passed. Retention is often limited, due to the rapid growth of performance monitoring data, which may consume an undesirable volume of storage in the live database. For that reason, historical performance monitoring data is typically moved to a separate database, which increases the difficulty in doing trend analysis between current and historical data when the data is stored into two separate databases. In some cases the data is stored in tapes and it will take a significant amount of time to restore the data for analysis.

When the applicable performance monitoring data, often containing transaction event log files, has been identified, a BI administrator may need to review multiple generated log files to assemble enough applicable information to understand the source of the problem and take action. In a typical distributed environment, a BI administrator may need to review hundreds or even thousands of log files that may be located across different servers. An investigation of such magnitude is very time consuming and technically challenging, because it requires linking disparate information from different server systems to generate a complete picture of the BI events, and hopefully sort through and pin point the problem.

SUMMARY

According to one embodiment of the present invention, a method, computer program product, and system for archiving monitoring data by enabling real-time analysis within a live database. The method for archiving monitoring data by enabling real-time analysis within a live database includes a processor that receives a set of parameters, wherein the set of parameters is selected based on monitoring data of a system application. The processor determines a historical schema of monitoring data and a retention period for a current schema of monitoring data, based on the set of parameters. The processor performs an impact analysis of the historical schema of monitoring data and the retention period of the current schema of monitoring data. In response to receiving acceptance of the impact analysis, the processor generates the historical schema which is applied to a table of monitoring data, populated by copying monitoring data from the current schema to the historical schema, within the live database. The processor removes monitoring data exceeding the respective rolling retention periods from the current schema and historical schema.

DETAILED DESCRIPTION

Figure 1:
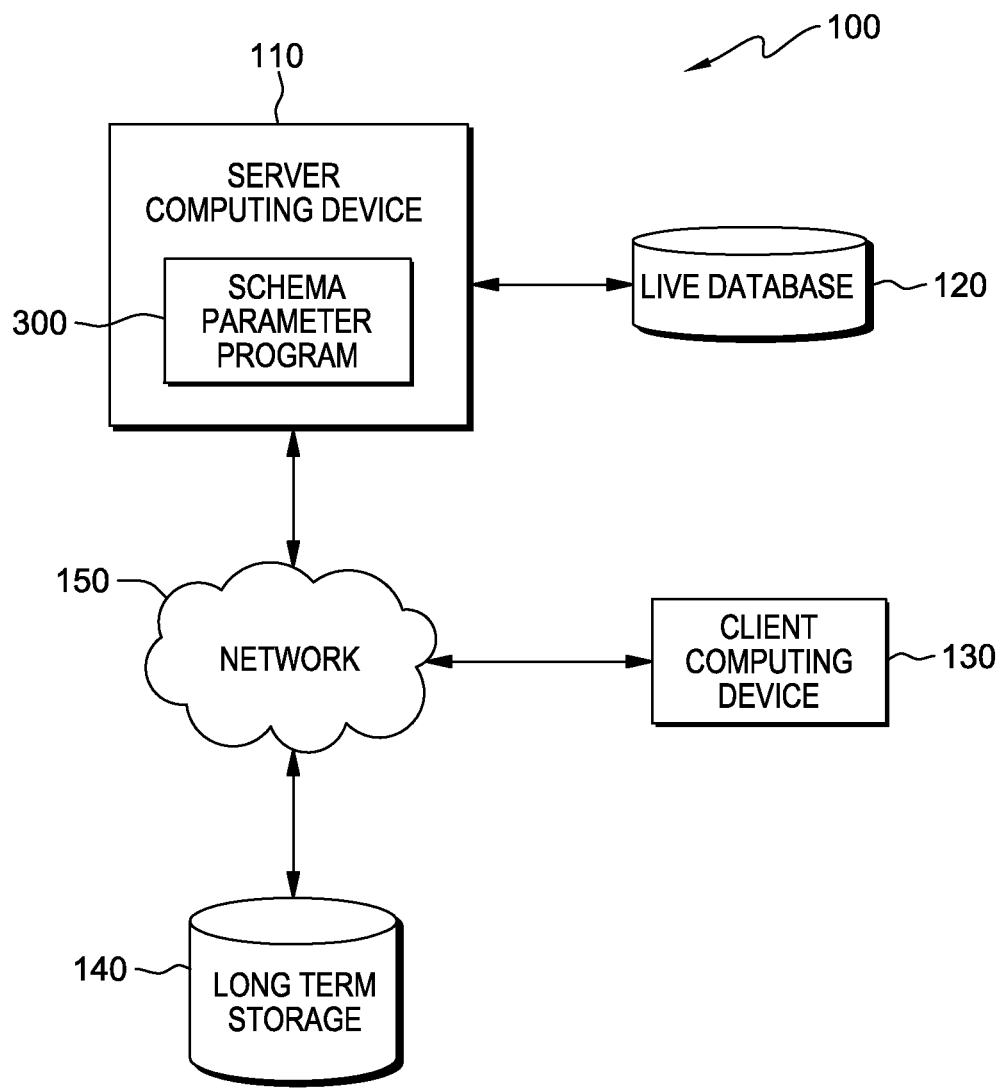
FIG. 1 is a functional block diagram illustrating a distributed transaction processing environment, in accordance with an embodiment of the present invention.

Embodiments of the present invention recognize that data retained by monitoring of a system and/or an application performing activities is used for investigating and troubleshooting issues. Historical monitoring data is often retained in storage separate from the live system and/or application performing the activities, and restoring archived data stored remotely impacts availability and performance of the system and/or application. In a more specific example, system performance associated with running queries and generating reports on data contained within a database, such as BI system performance, may degrade for a variety of reasons. Systems may collect monitoring data, such as performance monitoring data, for performance problem identification and issue resolution. Large amounts of system performance monitoring data can accumulate quickly, and as the data volume grows, analysis of the data becomes slower and may further impact the performance of the live current database. The large amount of performance monitoring data may consume too much storage space in the live database, leading to the storage of the performance monitoring data in a separate database, or other storage structure or device, further complicating analysis of data to determine and resolve reported performance issues.

Embodiments of the present invention provide a solution to keep a selection of near-current and historic monitoring data within the same live database, while maintaining an acceptable number of records, data size, and transaction performance level. Some embodiments of the present invention receive a selection of a set of parameters that define a rolling retention period for current and historic performance monitoring data, application activities to be included in the monitoring data, and an aggregation level to be applied to the selected application activities. Applying the set of parameters to the monitoring data allows the amount of data stored to be reduced in size, but remain applicable and effective in determining sources of performance issues. Although embodiments of the present invention may be applied broadly to various application or system monitoring scenarios, for purposes of clarity and brevity, the specific activity of monitoring BI system performance data for the running of queries and reports on a live database, will be used to represent the more general application or system monitoring data, and hereafter will be referred to as performance monitoring data.

Some embodiments of the present invention perform an impact analysis in which the selected set of parameters are used to calculate an approximation of the impact of applying the selected set of parameters to the live database, before actually making changes to the storage of the performance monitoring data. The approximation, or estimation, indicates the number of records that would potentially be included in forming log tables of current performance monitoring and analysis (PMA) data, having a particular schema, and log tables of PMA history data, having a different particular schema. Database tables are organized by columns and rows, and the data populated into the tables are organized by schemas. The impact analysis further calculates the size of the data stored in the live database, and an approximation of time for an average query execution. The results of the impact analysis are made available to confirm as acceptable, or if failing to be acceptable, allows changes to the selection of the set of parameters to iteratively arrive at more acceptable results.

The present invention will now be described in detail with reference to the Figures. FIG. 1 is a functional block diagram illustrating a distributed computer processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 1 is a functional block diagram illustrating distributed transaction processing environment 100, in accordance with an embodiment of the present invention. Distributed transaction processing environment 100 includes server computing device 110, which includes schema parameter program 300, live database 120, client computing device 130, and long-term storage 140, all interconnected via network 150.

Network 150 may be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between server computing device 110, live database 120, client computing device 130, and long term storage 140, and the operation of schema parameter program 300, within distributed computer processing environment 100, in accordance with embodiments of the present invention.

Live database 120 is a database accessible by server computing device 110, schema parameter program 300, and by client computing device 130 via network 150 connection and requests submitted to server computing device 110. In some embodiments of the present invention, live database 120 is a relational database and includes a current version of various business intelligence data, for example, which is organized by table spaces and tables, and the data within a particular table is formatted by a defined schema. A schema generally refers to the organization or structure applied to a database; however, in this case it refers to the columns of the particular table; applying aggregation and filtering functions to the data of the table. In some embodiments, live database 120 includes current performance monitoring and analysis (PMA) data, and historical PMA data, each spanning a respectively defined retention period.

Client computing device 130 is a computing device capable of submitting queries and submitting report requests to server computing device 110, via network 150, to be run against data within live database 120. For example, a user of client computing device 130 may submit a request to run a report to server computing device 110, via network 150, and server computing device 110 receives the request and initiates running the report against data in live database 120, and sends results back to client computing device 130.

In some embodiments of the present invention, client computing device 130 may be a desktop computing device, a rack mounted computing device, a blade server, a management server, a mobile computing device, a netbook computer, or any other electronic device or computing system capable of performing program instructions, and receiving and sending data. In other embodiments, client computing device 130 may represent a computing system utilizing multiple computers as a server system, such as in a cloud computing environment. In yet other embodiments, client computing device 130 may be a laptop computer, a tablet computer, a personal computer (PC), a desktop computer, a personal digital assistant (PDA), a smart phone, or any programmable electronic device capable of communicating with live database 120, server computing device 110, and long-term storage 140, via network 150. In another embodiment, client computing device 130 may be a computing system utilizing clustered computers and components (e.g., database server computer, application server computers, etc.) that act as a single pool of seamless resources when accessed within distributed computer processing environment 100. Client computing device 130 may include internal and external hardware components, as depicted and described with reference to FIG. 4.

Long-term storage 140 is a data storage device used to store back-up and/or archived data from live database 120. In some embodiments of the present invention, long term storage 140 may be a database in addition to live database 120. In other embodiments, long term storage 140 may be a tape storage device. In yet other embodiments, long term storage 140 may be a solid state storage device, or an optical storage device.

Server computing device 110 is a computer server supporting live database 120 and performing transactions against the structure and data of live database 120. In some embodiments, server computing device 110 receives database transaction requests, for example, transaction requests from client computing device 130. Server computing device 110 receives and processes transaction requests directed to live database 120, and returns results of the transactions to the requesting entity, such as client computing device 130. In other embodiments, a user, such as a database administrator, accesses live database 120 directly from server computing device 110. Server computing device 110 may perform maintenance, investigative, and corrective activity on live database 120, and may perform and direct back-up and archiving results to long-term storage 140.

In some embodiments of the present invention, server computing device 110 may be a desktop computing device, a rack mounted computing device, a blade server, a management server, a mobile computing device, or any other electronic device or computing system capable of performing program instructions, and receiving and sending data. In other embodiments, server computing device 110 may represent a computing system utilizing multiple computers as a server system, such as in a cloud computing environment. In yet other embodiments, server computing device 110 may be a laptop computer, a tablet computer, a netbook computer, a personal computer (PC), a desktop computer, a personal digital assistant (PDA), a smart phone, or any programmable electronic device capable of communicating with live database 120, client computing device 130, and long-term storage 140, via network 150. In another embodiment, server computing device 110 may be a computing system utilizing clustered computers and components (e.g., database server computer, application server computers, etc.) that act as a single pool of seamless resources when accessed within distributed computer processing environment 100. Server computing device 110 may include internal and external hardware components, as depicted and described with reference to FIG. 4.

Schema parameter program 300 includes operations to generate a schema for historical performance monitoring data tables within a live database, based on the schema of the current performance monitoring data of the live database. The schema and data for the historical performance monitoring data table is based on a selected set of parameters, which is used to generate a schema that is applied to the monitoring data. The selected set of parameters defines the data to be retained in the live database and attributes of the data.

Schema parameter program 300 also performs an impact analysis, based on the selected parameters, which determines how much data will be stored in the table of historical performance monitoring data, and the table of current performance monitoring data combined, the amount of database disk space to be consumed by storing the data, and an approximation of average execution time, such as the execution time of generating a PMA report. The impact analysis is performed prior to generating a table and storing historical performance monitoring data into the historical schema of the table. The impact analysis is also performed prior to finalization of the rolling retention periods for both the current schema and historical schema. The impact analysis enables iterative variations of the set of parameters to be considered, to achieve an acceptable level of impact to the performance and capacity of the database, prior to affecting the database. In some embodiments of the present invention, the set of parameters includes selection of rolling retention period, selection of application activities considered important to analysis of performance related issues, and the appropriate levels of granularity or aggregation of the data.

Figure 2A:
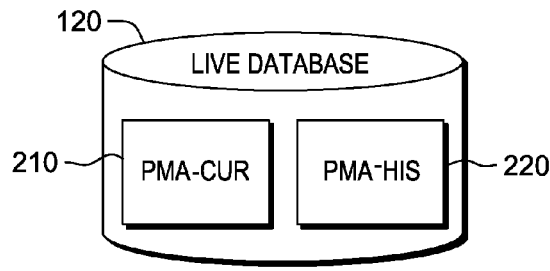
FIG. 2A is a functional block diagram depicting current and historical tables included in a live database, in accordance with an embodiment of the present invention.

FIG. 2A is a functional block diagram depicting current schema and historical schema tables included in a live database, in accordance with an embodiment of the present invention. FIG. 2A includes live database 120, depicted as including current schema 210 and historical schema 220. Live database 120 contains data organized by tables within table spaces. In some embodiments of the present invention, live database 120 is a relational database and includes a current version of various business intelligence (BI) data, for example. Live database 120 includes tables organized under schemas, and the data within a table is organized by rows and columns.

Current schema 210 is a table of current performance monitoring and analysis data. Performance monitoring data includes logging information associated with particular application activities performed on the data of live database 120. The application activities include, for example, reading data, executing, rendering content to portable document format (PDF), and writing data. Detailed time-based data that is associated with each application activity, which often includes a start time and a finish time of the activity, is included in the log entries. Current schema 210 includes current data organized by a schema that includes a very granular level of data. The data included in current schema 210 conforms to a schema that is particular to current schema 210, and includes current performance monitoring and analysis data for a defined rolling retention period. The rolling retention period is defined in the schema for current schema 210, and in one embodiment may include the current performance monitoring and analysis data for a twenty four hour period, for example. As performance monitoring data is continuously added to current schema 210, data from current schema 210 is continuously copied to historical schema 220, and cleaned up from current schema 210.

In some embodiments of the present invention, copying of data from current schema 210 to historical schema 220 is done for pre-defined time intervals, for example, every ten minutes the performance monitoring data within the ten minute period is copied from current schema 210 to historical schema 220. Current schema 210 contains the most current rolling twenty four hours of performance monitoring data, and can be used to perform troubleshooting within a twenty four hour period. Historical schema 220 contains all but the most current performance monitoring data (up to ten minutes of data difference between current schema 210 and historical schema 220) from current schema 210, and has a rolling retention period that extends longer than that of current schema 210. For example, historical schema 220 may have a rolling retention period of fourteen days. In this example, current schema 210 retains twenty four hours of current performance monitoring and analysis data, and historical schema 220 retains all but the most current data that has yet to be copied, within a fourteen day rolling retention period. As new data is included in the rolling retention period of a schema, the oldest data is removed from the schema, also referred to herein as being "cleaned up". In other embodiments, longer or shorter durations may be considered for transferring data from current schema 210 to historical schema 220.

PMA data grows quickly in response to high transaction activity. Rolling retention periods for current schema 210 are often chosen to include a limited amount of current data; however, enough performance monitoring data is kept to enable detailed and extensive analysis for performance problem resolution. Often, performance related problems with running queries or running reports, are determined by relative comparison to a previous experience with the same or similar operations. For example, a report summarizing sales of a group of products by geographical location may have required five minutes of run time in the previous two weeks, as reported by a user that is responsible for running and distributing the report. The current week's running of the same report took fifteen minutes. To investigate the potential performance problem associated with running a report against current data, support personnel require a more granular level of performance and analysis data from which a contribution or cause to the performance issue may be attributed and corrected.

However, for confirming that the most recent running of the report was much slower than previous experience, an investigating database administrator may only need to confirm the aggregate run time of all the activities associated with previously running the same report. Detailed log files containing the start, stop, and duration times of each of numerous activities, are not needed to confirm the aggregate historic report run time of fifteen minutes. Historical schema 220 is a table containing historical performance monitoring and analysis data. The granularity of data included in historical schema 220 may be a much coarser level of granularity, referred herein as a low level of granularity, which is less detailed than the granularity level of data for the current performance monitoring data of current schema 210. The performance monitoring data of current schema 210 may be at a much finer level of granularity, referred herein as a high level of granularity, or more detailed. In some embodiments of the present invention, historical schema 220 includes aggregated data that may be based on a schema of larger time intervals, as compared to the data of current schema 210. Additionally, historical schema 220 may not include all application activities; for example, based on experience, an activity of writing data to a PDF format may be omitted as the activity is not considered important to performance analysis. Historical schema 220 includes a rolling retention period that is larger than current schema 210, for example, a retention period of 14 days, as compared to one day. The data of historical schema 220 is based on a different schema than the data of current schema 210, making use of a coarser level of granularity, including less detail, by aggregation of data and particular selection of database application activities.

Figure 2B:
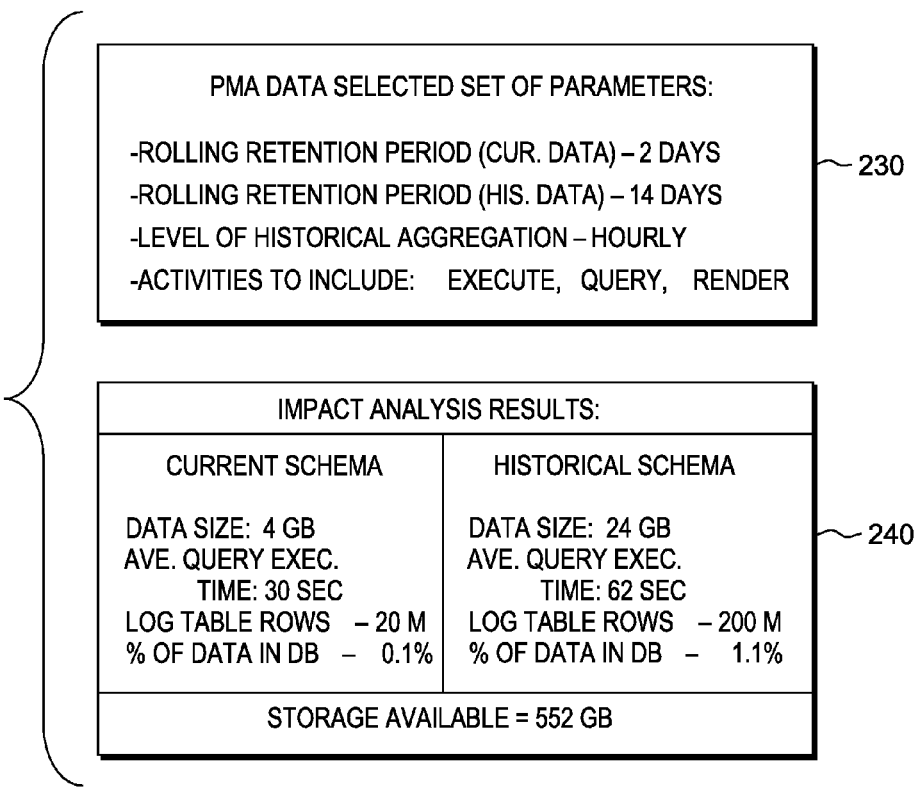
FIG. 2B is a functional block diagram depicting a parameter set selection example of performance monitoring and analysis data, and an impact analysis results example, in accordance with an embodiment of the present invention.

FIG. 2B is a functional block diagram depicting a parameter set selection example of performance monitoring and analysis data, and an impact analysis results example, in accordance with an embodiment of the present invention. FIG. 2B includes selected parameter set 230 and impact analysis results 240.

Selected parameter set 230 is an example of performance monitoring and analysis data parameters that define a retention period for data included in current schema 210 and a schema for data included in historical schema 220. Selected parameter set 230 includes a rolling retention period for current performance monitoring data of twenty four hours, and a rolling retention period of fourteen days for performance monitoring data included in historical schema 220. Current schema 210 defines a time interval of data receipt, after which the new data for the time interval is copied to historical schema 220. For example, every ten minutes, a ten minute block of new performance monitoring data is copied from current schema 210 to historical schema 220. In this manner, historical schema 220 retains the performance monitoring data of its rolling retention period, except for the new data that is yet to be copied to current schema 210. As data is added to both current schema 210 and historical schema 220 on an ongoing basis, data exceeding the respective rolling retention periods is cleaned up, which involves removal of data from current schema 210 and historical schema 220. In some embodiments of the present invention, some or all of data removed from historical schema 220 may be stored in long-term storage external to the live database, such as long term storage 140. In other embodiments, some or all of the data removed from historical schema 220 is discarded.

The performance monitoring data in current schema 210 is retained at a finer granularity, providing detailed log information to enable issue investigation and troubleshooting within a shorter retention period, such as a twenty four hour period. The performance monitoring data within historical schema 220 is retained at a more coarse level of granularity in which the data may be aggregated to be useful in trend and aggregate analysis, while keeping data size and performance impact at acceptable levels.

Selected parameter set 230 includes a parameter defining an aggregation of application activity for historical data of historical schema 220 at an hourly level of granularity, which includes much less detail than the activity data of current schema 210, which may be logged at the transaction time of the activity. Aggregation of activity data reduces the number of rows included in the table of historical schema 220, and reduces the overall data size of the table.

Impact analysis results 240 lists the approximated projected results of applying a retention period and copying interval to current schema 210, and generating and applying a historical schema to historical schema 220. Schema parameter program 300 projects the approximated results by determining the monitoring data to include and the aggregation level of the data, based on selected parameter set 230, prior to actually generating and populating the historical table, and prior to finalizing the retention periods for current schema 210 and historical schema 220. The retention periods define a set of data from which the data size and number of table rows can be determined. The selection of application activities and the level of aggregation applied to the included activity data, are used as part of the historical schema to consolidate detailed data, which results in a reduced number of rows of data and reduced size of the data to be stored. In some embodiments of the present invention, approximated average execution time is determined by tracking the historical performance monitoring report queries generated over different volumes. From the historical monitoring report queries, an approximate report time for key PMA reports is estimated. For example, review of live database 120 indicates that PMA report A and B are extensively requested, along with queries X, Y, and Z. Performance data is tracked for execution of these reports and respective queries over various volumes of data. The resulting performance data is retained and used to extrapolate approximate execution times for reports under the simulated conditions defined by the set of parameters used for the impact analysis. It is acknowledged that the execution times determined in this manner are estimates and although they may not be precise, they are useful for understanding the relative potential impact to the database by the selected set of parameters.

In some embodiments, the compiled performance data used to extrapolate approximated average execution time is based on a linear relationship over a narrow range of parameters, whereas an exponential relationship may exist over a broader range of parameters selected as the set of parameters used to define the schemas for current schema 210 and historical schema 220.

Impact analysis results 240 depicts an example impact of applying selected parameter set 230 to set a rolling retention period for current schema 210. The results depict a data size of 4 gigabytes (GB), and average query execution time of 30 seconds, a table that includes 20 million rows of data and the table consuming 0.1% of the storage capacity of live database 120. Similarly, Impact analysis results 240 depicts a resulting impact of applying selected parameter set 230 to historical schema 220 as: a data size of 24 GB, an average query execution time of 62 seconds, a table with 200 million rows of data, and a size that consumes 1.1% of the storage capacity of live database 120. Impact analysis results 240 further indicates that 552 GB of storage capacity remains available in live database 120, which, in this example, does not include the 24 GB of potential historical data in historical schema 220.

Figure 3:
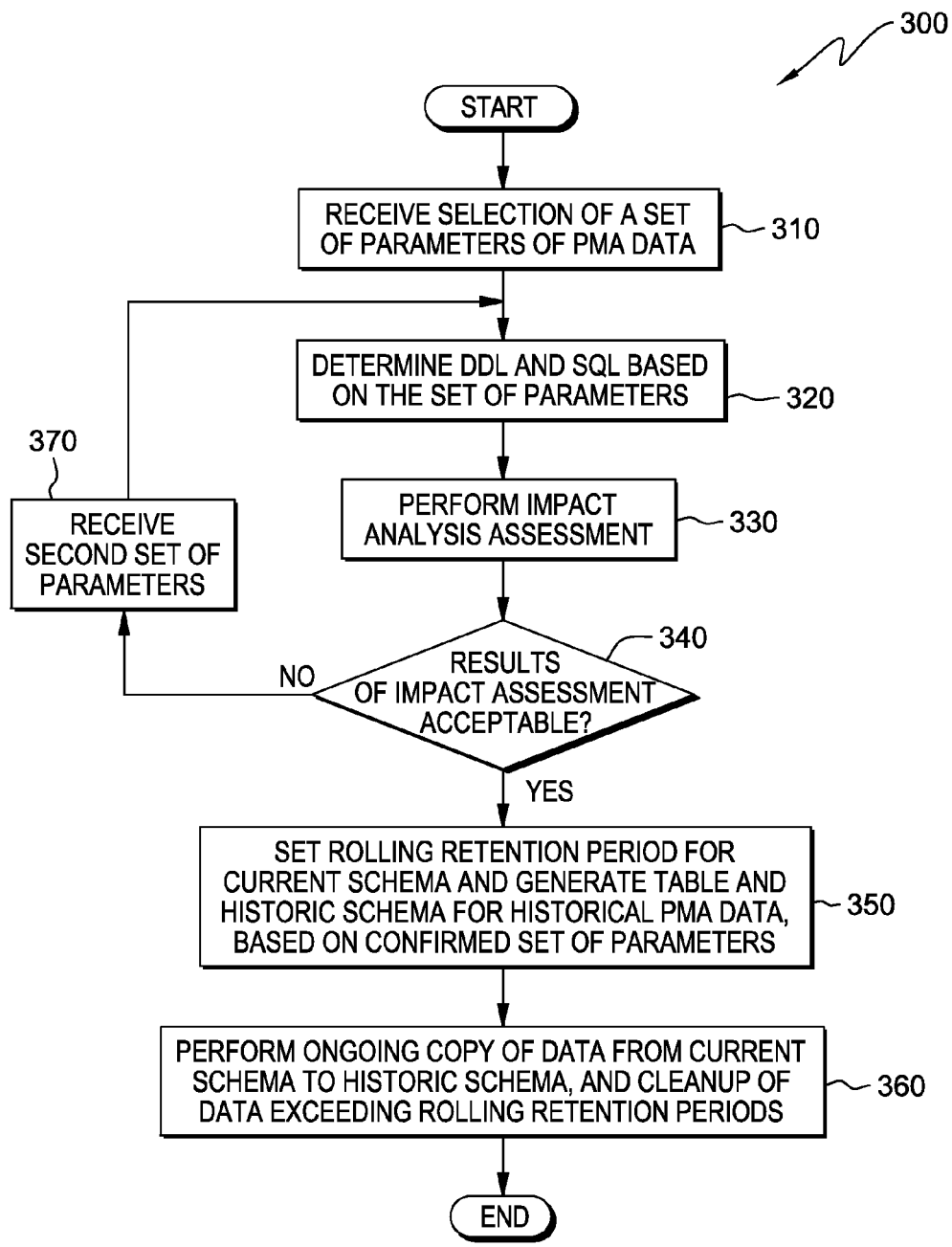
FIG. 3 illustrates operational steps of a schema parameter program, inserted on a computing device within the data processing environment of FIG. 1, in accordance with an embodiment of the present invention.

FIG. 3 illustrates operational steps of schema parameter program 300, inserted on server computing device 110, within distributed transaction processing environment 100 of FIG. 1, in accordance with an embodiment of the present invention. Schema parameter program 300 receives a selection of a set of parameters of PMA data (step 310). A user selects parameters to be used for setting a retention period for the current and historical PMA data, and for table and schema generation for maintaining historical PMA data, within the live database. The selected set of parameters is received by schema parameter program 300. The set of parameters selected may include, for example, rolling retention period for current and historical PMA data, application activities to be included, and a level of aggregation of data to be applied to historical data tables.

Schema parameter program 300 determines the data definition language (DDL) statements, and structured query language (SQL) statements, based on the set of parameters received (step 320). Data definition language, also referred to as data description language (DDL) is a syntax similar to a computer programming language, used for defining data structures, especially database schemas. A database schema is the structure of a database that defines the organization and format of data included in data structures, such as database tables. Structured query language (SQL) is a database programming language designed to manage data in a relational database management system. DDL and SQL statements are generated by schema parameter program 300, based on the selected set of parameters.

Schema parameter program 300 performs an impact analysis assessment (step 330). Using the DDL and SQL statements that are generated based on the selected set of parameters, schema parameter program 300 determines the approximate impact to the live database if the current selected set of parameters are used to set the rolling retention period of current PMA schema and generate the schema for the historical PMA tables. Schema parameter program 300 determines the impact without actually generating and populating the historical schema and tables, similar to simulating the impact, and therefore presents the impact information to be considered, without actually impacting the live database. For example, schema parameter program 300 uses a set of parameters received as input. The set of parameters include information defining the rolling retention periods of the current schema and historical schema, such as twenty-four hours for the current schema and fourteen days for the historical schema. The set of parameters may also include some or all of the application activities, such as execute and/or render, but omitting writing to PDF files. The level of granularity or aggregation of the data associated with the application activities is included in the historical schema, to manage the size of the data and the impact to execution time of queries.

The impact analysis provides results that in some embodiments of the present invention, include: the size of the stored performance monitoring data, the (approximated) average query execution time, the number of rows in the current and historical performance monitoring log tables, and the percentage of the live database occupied by the monitoring data, as determined by the size or amount of the performance monitoring data to be stored.

Having performed an impact analysis based on the received set of parameters, schema parameter program 300 receives input indicating if the results of the impact analysis are acceptable (decision step 340), and determining that the results are not acceptable (step 340, "NO" branch), schema parameter program 300 receives an adjusted set of parameters (step 370). The results of the impact analysis are presented by schema parameter program 300 and may include information regarding the number of table rows, the size of the data to be stored in the table, the consumption of database capacity, and the approximated average execution time of queries. The approximated average query execution time may be based on the history of query types run, applied to the proposed tables that are based on the current set of parameters that are received. Schema parameter program 300 receives input indicating that the impact analysis results, based on the first (initial) set of parameters, are not acceptable, and enables editing of the first set of parameters. Schema parameter program 300 receives an adjusted set of parameters, which includes changes to the first set of parameters, and the adjusted set of parameters replaces the first set of parameters. Having received the adjusted set of parameters, schema parameter program 300 determines the DDL and SQL statements based on the adjusted set of parameters, and continues as described above.

Determining that the results are acceptable (step 340, "YES" branch), schema parameter program 300 sets a rolling retention period for the current schema data and generates a schema for the historical PMA data, based on a confirmed set of parameters (step 350). The DDL and SQL statements corresponding to the confirmed impact analysis, are used by schema parameter program 300 to set the rolling retention period for the current schema and generate the historical schema to be applied to the historical PMA data, and the rolling retention period for the historical PMA table.

Having generated the schemas and populated the tables for the current PMA data and the historical PMA data, schema parameter program 300 performs an ongoing copy of data from the current schema to the historical schema, and a cleanup of the data exceeding the respective rolling retention periods (step 360). Monitoring data is continuously added to the current schema, on an ongoing basis. Schema parameter program 300 performs ongoing copying of current data to the historical PMA data, for example, historical schema 220, based on a defined time interval, such as every ten minutes. Schema parameter program 300 removes the data from the current PMA table that exceeds the rolling retention period, for example, monitoring data that exceeds a twenty four hour rolling retention period. Schema parameter program 300 populates the copied data from current schema 210 into historical schema 220, for example, and removes the data exceeding the rolling retention period defined by the set of parameters for the historical schema. For example, the monitoring data exceeding the fourteen day rolling retention period is cleaned up by schema parameter program 300. In some embodiments of the present invention, schema parameter program 300 discards the data subsequent to exceeding the historical PMA table schema retention limits. In other embodiments, schema parameter program may store data exceeding the historical PMA table schema retention limits in an archiving storage device, such as long-term storage 140 (FIG. 1).

Schema parameter program 300 continues, on an ongoing basis, to copy data from the current PMA table to the historic PMA table, based on a pre-set update time period, and removes the data exceeding the respective rolling retention periods. For example, on an ongoing basis, having populated historical schema 220 with fourteen days of monitoring data from current schema 210, current schema 210 continues to receive performance monitoring data. Schema parameter program 300 continuously copies monitoring data from current schema 210, on a defined time interval, such as every ten minutes, to historical schema 220. Schema parameter program 300 cleans up current schema 210 by removing the data exceeding the rolling retention period of twenty four hours, and cleans up historical schema 220 by removing monitoring data exceeding the fourteen day rolling retention period.

Figure 4:
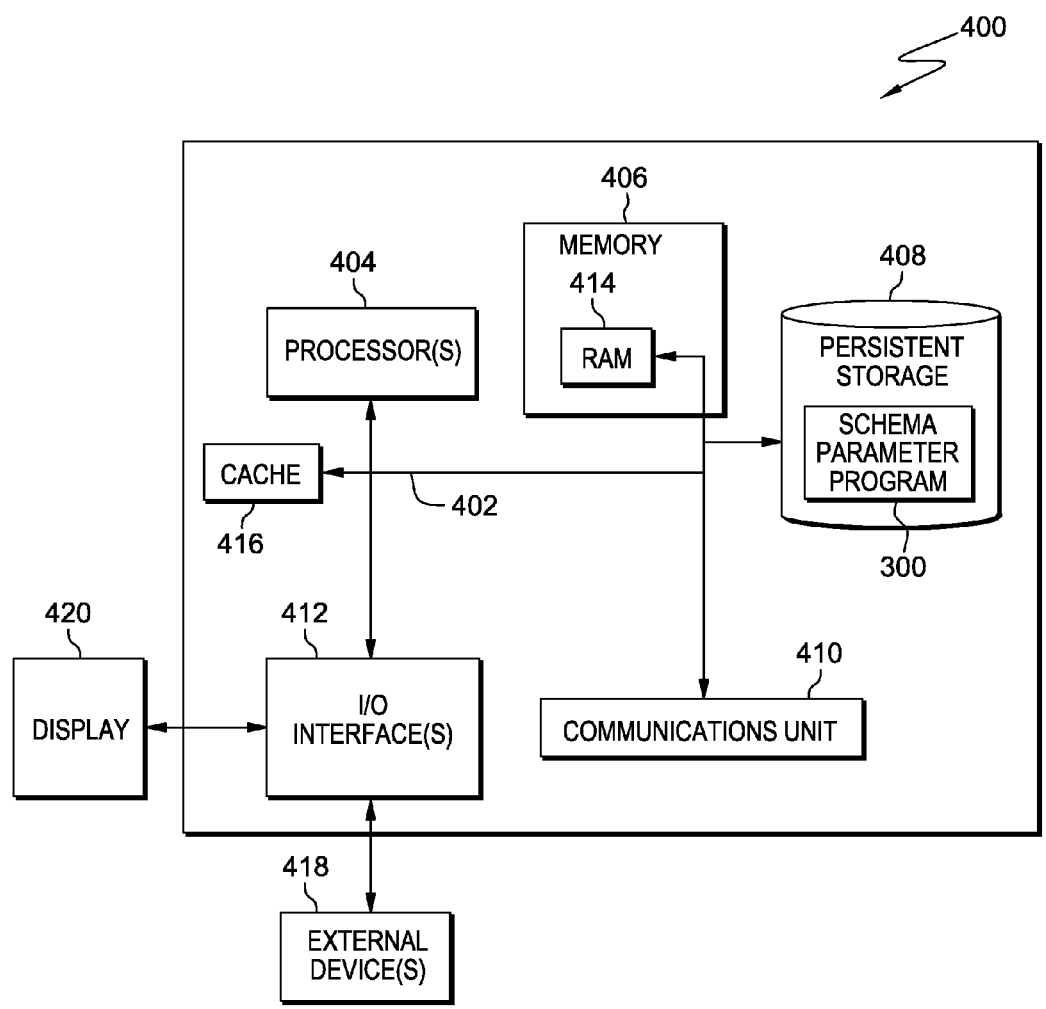
FIG. 4 depicts a block diagram of components of a computing device capable of operating the schema parameter program, in accordance with an embodiment of the present invention.

FIG. 4 depicts a block diagram of components of computing device 400 capable of operating schema parameter program 300, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 400, server computing device 110, and client computing device 130 include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Schema parameter program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed communication processing environment 100. In these examples, communications unit 410 includes one or more network interface cards. Communications unit 410 may provide communications through the use of either or both physical and wireless communications links. Schema parameter program 300 may be downloaded to persistent storage 408 through communications unit 410.

I/O interface(s) 412 allows for input and output of data with other devices that may be connected to computing device 400, server computing device 110 and client computing device 130. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., schema parameter program 300 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for managing monitoring data of a live database by enabling real-time analysis within the live database, the computer program product comprising:

a computer readable storage medium having program instructions embodied therewith, wherein the program instructions are executable by a computer processor to cause the computer processor to perform a method comprising:
determining a historical schema of monitoring data, based on a set of parameters, wherein the set of parameters includes types of application activity monitored, an aggregation level for the monitoring data of application activity, a rolling retention period for the historical schema, and a rolling retention period for a current schema wherein the monitoring data includes performance monitoring and analysis data;
performing an impact analysis of the historical schema and the current schema on the live database in a memory, based on the set of parameters, prior to generation and population of tables for the historical schema in the live database, and prior to setting the rolling retention period of the historical schema and the current schema of monitoring data in the live database, wherein the impact analysis generates one or a combination from a group that includes: an estimation of database capacity occupied by the monitoring data, and an average time of performing a query;
in response to an unacceptable impact analysis, adjusting the set of parameters and performing an additional impact analysis prior to the generation and population of tables for the historical schema in the live database, and prior to setting the rolling retention period of the historical schema and the current schema of monitoring data, in the live database; and
in response to receiving an acceptable impact analysis, generating the historical schema, wherein the historical schema is populated by copying the monitoring data from the current schema to the historical schema, aggregating the data copied from the current schema, removing monitoring data from the current schema and the historical schema that exceeds the rolling retention periods, respectively, and setting the rolling retention period of the historical schema and the rolling retention period of the current schema, within the live database, based on the set of parameters of the acceptable impact analysis.

2. The computer program product of claim 1, further comprising:
removing monitoring data from the current schema and the historical schema that exceeds the rolling retention period of the current schema and the historical schema, respectively.

3. The computer program product of claim 1, wherein the impact analysis indicates an estimation of: stored monitoring data size, number of rows in monitoring data tables, percentage of the live database occupied by the monitoring data, and an average execution time of a query, based on the set of parameters that are selected.

4. The computer program product of claim 1, wherein the monitoring data is performance monitoring data of a business intelligence (BI) system running on the live database.

5. The computer program product of claim 1, wherein determining a historical schema of monitoring data and a retention period for a current schema of monitoring data, based on the set of parameters includes determining data definition language (DDL) statements and structured query language (SQL) statements to generate tables and apply the historical schema to the monitoring data.

6. A computer system for archiving of performance monitoring data by enabling real-time analysis within a live database, the computer system comprising:
one or more computer processors;
one or more computer readable storage media; and
program instructions stored on the computer readable storage media for execution by at least one of the one or more processors, the program instructions comprising:
program instructions to determine a historical schema of monitoring data, based on a set of parameters, wherein the set of parameters includes types of application activity monitored, an aggregation level for the monitoring data of application activity, a rolling retention period for the historical schema, and a rolling retention period for a current schema wherein the monitoring data includes performance monitoring and analysis data;
performing an impact analysis of the historical schema and the current schema on the live database in a memory, based on the set of parameters, prior to generation and population of tables for the historical schema in the live database, and prior to setting the rolling retention period of the historical schema and the current schema of monitoring data in the live database, wherein the impact analysis generates one or a combination from a group that includes: an estimation of database capacity occupied by the monitoring data, and an average time of performing a query;
in response to an unacceptable impact analysis, adjusting the set of parameters and performing an additional impact analysis prior to the generation and population of tables for the historical schema in the live database, and prior to setting the rolling retention period of the historical schema and the current schema of monitoring data, in the live database; and
in response to receiving acceptance of the impact analysis, program instructions to generate the historical schema, wherein the historical schema is populated by copying the monitoring data from the current schema to the historical schema, aggregating the data copied from the current schema, removing monitoring data from the current schema and the historical schema that exceeds the rolling retention periods, respectively, and setting the rolling retention period of the historical schema and the rolling retention period of the current schema, within the live database, based on the set of parameters of the acceptable impact analysis.

7. The computer system of claim 6, wherein the impact analysis indicates an estimation of: stored monitoring data size, number of rows in monitoring data tables, percentage of the live database occupied by the monitoring data, and an average execution time of a query, based on the set of parameters that are selected.

8. The computer system of claim 6, wherein the monitoring data is performance monitoring data of a business intelligence (BI) system running on the live database.

9. The computer system of claim 6, wherein determining a historical schema of monitoring data and a retention period for a current schema of monitoring data, based on the set of parameters includes determining data definition language (DDL) statements and structured query language (SQL) statements to generate tables and apply the historical schema to the monitoring data.

10. The computer system of claim 6, further comprises:
program instructions to remove monitoring data from the current schema and the historical schema that exceeds the rolling retention period of the current schema and the historical schema, respectively.

* * * * *